Figure 1:
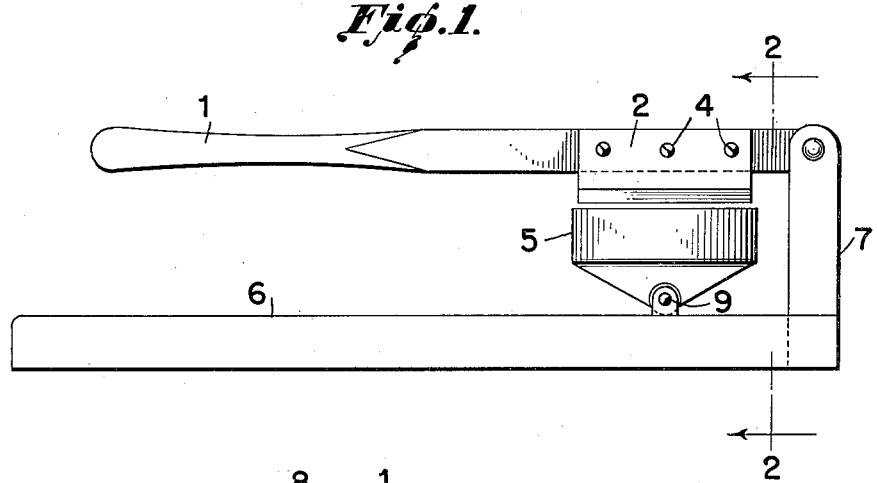

March 7, 1950  G. C. LE COMPTE  2,499,395

CLASSIFICATION OF WOOL

Filed Sept. 10, 1948

Inventor
GEORGE C. Le COMPTE

By

L. M. Mantell
ATTORNEYS

Patented Mar. 7, 1950

2,499,395

UNITED STATES PATENT OFFICE 2,499,395

CLASSIFICATION OF WOOL

George C. Le Compte, North Arlington, Va.

Application September 10, 1948, Serial No. 48,545

7 Claims. (Cl. 73—32)

(Granted under the act of March 3, 1883, as amended April 30, 1928; 370 O. G. 757)

This application is made under the act of March 3, 1883, as amended by the act of April 30, 1928, and the invention herein described and claimed if patented in any country, may be manufactured and used by or for the Government of the United States of America throughout the world for governmental purposes without the payment to me of any royalty thereon.

This invention relates to a method of determining the comparative fineness of wool fibers, or other fibers, and to an apparatus for applying the method.

One method used at present for determining the fineness of wool fibers consists in the following sequence of operations. A tuft of the wool is pulled down into a narrow slit cut in a thin polished plate, a thin metal tongue is shoved down the slit and compacts the wool. The projecting ends of the fibers are cut off smooth with a sharp razor blade on both sides of the thin metal plate. A fine screw then operates to extend the short fibers within the metal plate partially out of the slit by from 0.001 inch to 0.01 inch. The projecting portion is then again cut off with a sharp razor blade producing short sections of the desired length. These short sections can then be placed on a microscope slide and measured under the microscope.

At present, in measuring the fineness of wool fibers three techniques are used. In one method, relatively long lengths of wool are arranged in a parallel position across a microscope slide. In another, short cross sections are mixed with a solvent and spread upon a microscope slide. In the third, a cross section of a large number of fibers is rigidly held together and examined under a microscope slide. To determine the fineness of wool samples, it is necessary to enter upon a painstaking measurement of from 400 fibers, in some samples, on up to 1,600 fibers on more variable samples. The cross section method, under another technique, that of counting the number of cross section fibers included within a square of a given size, does obviate some of the difficulties involved in measuring large numbers of fibers. However, the results obtained depend, to some extent, upon personal judgment, since it is necessary to estimate how tightly the fibers have been packed in the reference square.

To avoid these tedious methods I have devised a method in which the fibers are cut into short sections of uniform length, preferably no greater than 200 microns in length, the sections then suspended in a solvent, and allowed to settle. I have found that the coarse fibers settle more rapidly than fine fibers, and that by this sedimentation technique the fibers in a section of wool are distributed into a continuous array determined to a substantial extent by the fineness of the fibers under test. The advantages of this method are as follows: (1) It deals with a great number of fibers at one time, 100,000 to 200,000 short cross sections being easily settled together. (2) It is completely independent of individual judgment. The degree of settling is determined by the solvent used, its temperature, and by the fineness of the fibers under test. (3) The technique is rapid.

The actual sedimentation may be completed in 74 seconds. It is possible to obtain final results in about 30 minutes on any sample as contrasted with an all day testing period on some samples by microscopic measurement.

The drawing illustrates forms of apparatus found particularly useful in carrying out the wool cutting and the sedimentation steps.

Figure 2:
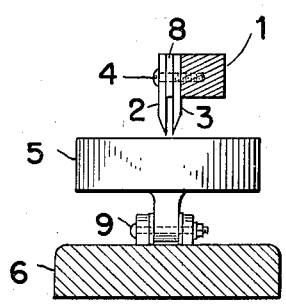
Figure 3:
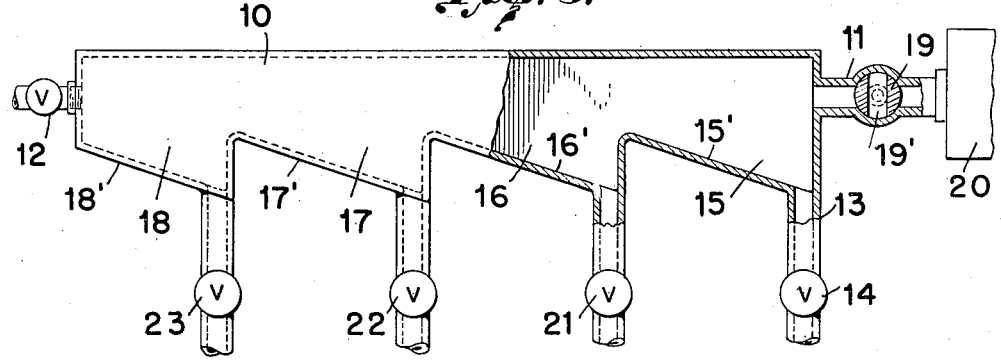

Figure 1 is a front view of the cutter; Figure 2 is a section on plane 2—2; and Figure 3 is front view of the sedimentation apparatus, partly in section, and turned to horizontal position.

The cutter consists of a handle 1 which carries razor blades 2 and 3. The latter are separated by plate 8, and fastened by screws 4 to handle 1. The two razor blades are held so that their sharpened edges are inclined to each other. The strands of wool, or other fibers to be tested, are stretched on block 5, which is free to rock on hinge 9. The upper surface of block 5 is made of end grain of wood, or of gutta-percha, or of rubber somewhat harder than ordinary pneumatic tire rubber. The short sections are cut by pressing the two sharp rigidly held razor blades straight down upon the wool. This is repeated as many times as desired, upon subsequent tufts of wool. This is helpful in fineness tests on scoured wools which have not had the blending and homogenizing that wool top and yarn has had. After the decided number of cross sections have been cut, the accumulation can be removed from between the razor blades by releasing one blade from the apparatus and brushing the accumulated cross sections into a convenient receptacle.

The accumulated wool sections are then mixed with the liquid suspending medium and a portion introduced into the passage 19' of stopcock 19. Passage 19' may conveniently contain 2 cc. of the mixture. The separator 10 is first filled with the suspending liquid, which is free of air bubbles and free of wool particles. Separator 10 is then held in vertical position, with vessel 20 and cock 19 uppermost, the liquid being quiescent. The mixture in 19' is then permitted to move down in the quiescent liquid in 10, which is held vertically for a pre-determined time, for example, 30 seconds. This permits the wool particles to segregate or stratify or array in the vertical column 10, the finest particles being above, the coarsest particles falling to the bottom. Column 10 is then turned to the horizontal, to the position shown in Figure 3. The particles in the four zones 15, 16, 17, 18, thereupon move downwardly and deposit on the sloping faces 15', 16', 17', 18', and may be washed therefrom into the respective outlet ducts 13, provided with valves 14, 21, 22, and 23.

Wall 10 may have a removable opening, for access to the interior. Outlet 12 may be used to remove the upper liquid layer after deposition of the fibers. Flushing means may be introduced through 12.

By weighing the four deposits the proportion of the four grades of fineness of wool in the sample is determined.

The preferred length of the fibers is dependent upon the characteristics thereof and of the average diameter. With wool fibers, lengths greater than 200 microns will lead to difficulties, such as entanglement of the fibers in the column 10. Wool fibers no greater than 100 microns in length are preferred. Twenty to 100 microns is the preferred range.

The process and apparatus are obviously applicable to cotton, jute, silk, nylon, and other fibers.

Various suspending liquids may be used. Liquids inert to wool such as kerosene, very dilute aqueous soap solution, or water containing other wetting agents are employed.

Other types of classifying apparatus may be used, such as a centrifugal separator.

Having thus described my invention, I claim:

1. A method of classifying wool comprising permitting a sample of the wool in the form of filaments having a substantially uniform length no greater than 200 microns to move down in a path through a vertical body of liquid and removing the filaments at spaced points in the path.

2. The method of claim 1 in which the filaments removed at the spaced points are separately weighed.

3. The method of claim 1 in which the sample of filaments moves downwardly in the liquid for a pre-determined period of time permitting the fibers to array themselves, the coarser fibers being below, the vertical body of liquid being subsequently turned to the horizontal to permit the arrayed fibers to descend and be collected at the spaced points.

4. The method of claim 3 in which the length of the fibers is no greater than 100 microns.

5. The method of claim 3 in which the filaments removed at the spaced points are separately weighed.

6. The method of claim 1 in which the length of the fibers is in the range 20 to 100 microns.

7. The method of claim 1 in which sample is wetted with liquid and all filaments thereof simultaneously introduced into the body of quiescent liquid.

GEORGE C. LE COMPTE.

REFERENCES CITED

The following references are of record in the file of this patent:

UNITED STATES PATENTS

| Number | Name | Date |
| --- | --- | --- |
| 1,296,737 | Baring-Gould | Mar. 11, 1919 |
| 1,516,738 | Kasser | Nov. 25, 1924 |
| 1,621,535 | Haultain | Mar. 22, 1927 |
| 2,308,672 | Brady, Jr. | Jan. 19, 1943 |